TRANSISTOR SWITCHING CIRCUIT

Filed Oct. 20, 1954

INVENTORS
ADRIANUS JOHANNES WILHELMUS
MARIE VAN OVERBEEK
JOHANNES THEODORUS ANTONIUS VAN LOTTUM
BY Fred M. Vogel
AGENT United States Patent Office 2,890,353

Patented June 9, 1959

2,890,353

TRANSISTOR SWITCHING CIRCUIT

Adrianus Johannes Wilhelmus Marie van Overbeek and Johannes Theodorus Antonius van Lottum, Eindhoven, Netherlands, assignors, by mesne assignments, to North American Philips Company, Inc., New York, N.Y., a corporation of Delaware Application October 20, 1954, Serial No. 463,578

Claims priority, application Netherlands October 24, 1953

9 Claims. (Cl. 307—88.5)

The present invention relates to transistor switching circuits which for an input voltage may occupy only one of two positions having a very high resistance and a very small resistance, respectively. An object of this invention is more particularly to provide a switching circuit which exhibits a current-voltage characteristic curve similar to that of a gaseous discharge tube, but which, with respect to gaseous discharge tubes, affords the advantage that the "ignition voltage" may be considerably lower and is furthermore very little dependent upon the component parts of the switching circuit used.

The present invention comprises the known combination of an NPN transistor and a PNP transistor, the base electrode of each of which is connected to the collector electrode of the other. A reference voltage is applied to the base electrode of one transistor through a comparatively high impedance, so that the switching circuit passes from a position of very high resistance to one of very small resistance when an input voltage at the emitter electrode of said transistor exceeds the reference voltage.

In order that the invention may be readily carried into effect, it will now be described with reference to the accompanying drawing, given by way of example, in which.

Figure 1:
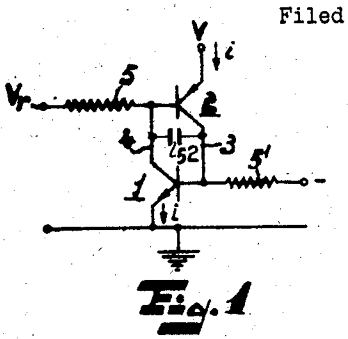
Fig. 1 is a schematic diagram of an embodiment of the switching circuit of the present invention.

Fig. 1 is a schematic diagram of an embodiment of the switching circuit of the present invention. Fig. 1 shows the known combination of an NPN transistor 1 and a PNP transistor 2, in which the base electrode of transistor 1 is connected by a lead 3 to the collector electrode of transistor 2 and the base electrode of transistor 2 is connected by a lead 4 to the collector electrode of transistor 1. As is well-known, this combination is identical with a NPNP transistor, of which the intermediate P and N layers correspond to the base layers of the transistors 1 and 2.

Figure 2:
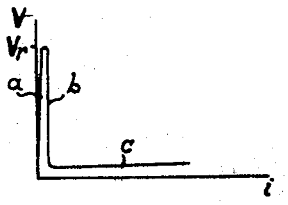
Fig. 2 is a corresponding current-voltage characteristic curve of the switching circuit of the present invention.

The present invention is based on the discovery of the fact that, if the base electrode of transistor 2 is connected by way of a comparatively high impedance 5 to a source of reference voltage $V_r$ which may vary between 1 volt and tens of volts, the current *i* traversing the combination 1, 2 as a function of an input voltage V at the emitter electrode of transistor 2, varies as shown in Fig. 2. As long as the input voltage V remains lower than the reference voltage $V_r$, the combination 1, 2 has an effective resistance between 0.3 and several megohms, corresponding to the slope of the branch *a* of the current-voltage curve of Fig. 2. This effective resistance is further increased if the base electrode of transistor 1 is connected by way of a high impedance 5' to a point of low blocking potential with respect to its emitter electrode.

However, as soon as the input voltage V exceeds the reference voltage $V_r$, the combination 1, 2 exhibits a negative resistance corresponding to the slope of the branch *b* of the current-voltage curve of Fig. 2, so that the current *i* increases suddenly (the combination 1, 2 "breaks down") until a point of equilibrium on the branch *c* of the curve of Fig. 2, having a low positive resistance of about 10 ohms, is reached. At the point of equilibrium, the voltages at the various transistor electrodes differ by less than few tenths of a volt from the voltage at the emitter electrode of transistor 1, so that only a small amount of energy is dissipated in the transistors 1 and 2. The adjustment to the branch *a* is again obtained by decreasing the input voltage V to below the voltage corresponding to the branch *c*.

The current-voltage curve shown in Fig. 2 is similar to the characteristic curve of a gaseous discharge tube in which the reference voltage $V_r$ corresponds to the ignition voltage and the voltage of the branch *c* corresponds to the conduction voltage of the gaseous discharge tube. The circuit of Fig. 1 may thus be used in circuits in a similar manner as gaseous discharge tubes and more particularly in those circuits in which it is important that the ignition voltage be exactly determined or adjustable. Several circuits are described hereinafter in which these properties are utilized.

Figure 3:
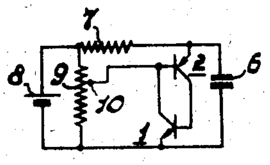
Fig. 3 is a schematic diagram of a sawtooth generator utilizing the switching circuit of the present invention.
Figure 4:
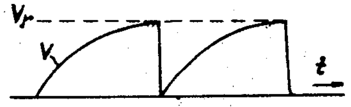
Fig. 4 is a corresponding voltage-time curve of the sawtooth generator of Fig. 3.

Fig. 3 is a schematic diagram of a sawtooth generator utilizing the switching circuit of the present invention. In Fig. 3, the combination 1, 2, which is bridged by a capacitor 6, is connected by way of a resistor 7 to a voltage source 8; the resistor 5 of Fig. 1 being replaced by a potentiometer 9 connected in parallel with the source 8. The input voltage V across the capacitor 6 then has a sawtooth shape as shown in Fig. 4, for as soon as said voltage V exceeds the reference voltage $V_r$ at a tapping point 10 on the potentiometer 9, the combination 1, 2 becomes conductive and hence the sawtooth flies back.

Since the input voltage V and the reference voltage $V_r$ are derived from the same source 8, the repetition frequency of the generated oscillation, even if said voltage $V_r$ is only slightly smaller than that of source 8, is still substantially dependent upon the time-constant of the RC-combination 6, 7. It is evident that, as an alternative, the pulsatory current traversing the combination 1, 2 may be utilized by series-connection thereof with an impedance. The current *i* may be led, for example, through a small coil of a loudspeaker, resulting in a simple metronome.

Figure 5:
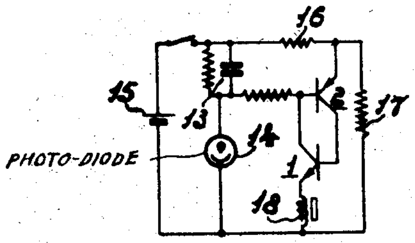
Fig. 5 is a schematic diagram of a retarding circuit utilizing the switching circuit of the present invention.

Fig. 5 is a schematic diagram of a retarding circuit utilizing the switching circuit of the present invention. In Fig. 5, the reference voltage is produced by way of an integrating network 13 which, in series with a photodiode 14, is connected in parallel with a voltage source 15 which also supplies, by way of a potentiometer 16, 17, the input voltage for the combination 1, 2. If now, as a function of the amount of light striking the photodiode 14, the voltage across the network 13 decreases to below the input voltage at the emitter electrode of the transistor 2, the combination 1, 2 becomes conductive and operates an effective load 18, for example a magnetically-operated photographic shutter.

Figure 6:
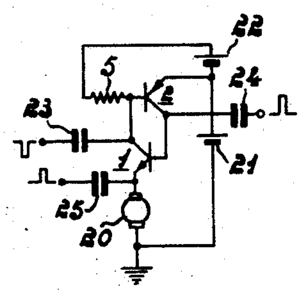
Fig. 6 is a schematic diagram of a control circuit for an electric motor utilizing the switching circuit of the present invention.

The switching circuit of Fig. 1 is also highly suited for switching power consuming devices, such as relays or electric motors, on and off. Fig. 6 is a schematic diagram of a control circuit for an electric motor utilizing the switching circuit of the present invention. In Fig. 6, a motor 20, in series with the combination 1, 2, is connected to a source of supply 21, of which the voltage remains below that set up at the base electrode of transistor 2, since said base electrode is connected by way of resistor 5 and a voltage 22 to the emitter electrode of transistor 2. However, if a negative pulse of suitable amplitude is applied to the base electrode of transistor 2 by way of a blocking capacitor 23, or a positive pulse of suitable amplitude is applied to the base electrode of transistor 1 by way of a blocking capacitor 24, the combination 1, 2 becomes conductive and the motor 20 is energized. It is possible for the power delivered to the motor 20 to be considerably higher than that which is dissipated in the transistors 1 and 2 or would at the most be allowed to be dissipated therein, since the voltage across the motor 20 may be substantially equal to that of supply source 21. The switching-off operation may be effected, for example, by supplying a positive pulse to the emitter electrode of transistor 1 by way of a blocking capacitor 25.

If two of the switching circuits of Fig. 1 are simultaneously connected in parallel with the source of supply, only one of them becomes conductive. This property is utilized, for example, in automatic telephony to prevent two subscribers calling at the same time from making connection with a third subscriber via a common connecting circuit. The switching circuit of the present invention has the advantage that its voltage and energy loss and hence the heat-development of the surroundings is extremely small.

Figure 7:
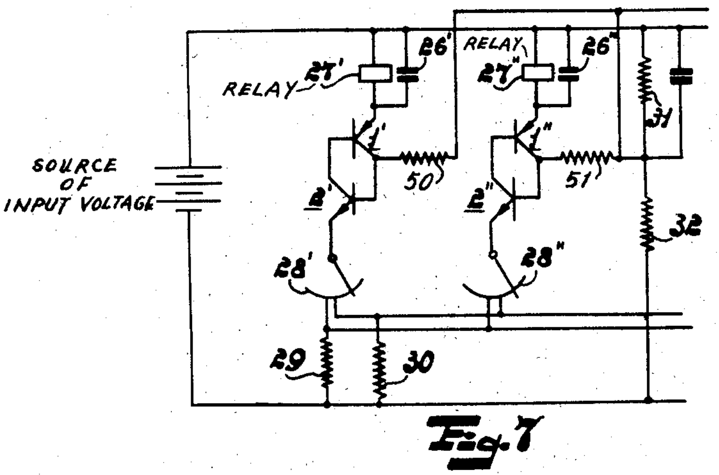
Fig. 7 is a schematic diagram of a selector circuit for an automatic telephone switching system utilizing the switching circuit of the present invention.

Fig. 7 is a schematic diagram of a selector circuit for an automatic telephone switching system utilizing the switching circuit of the present invention. In Fig. 7, transistor combinations 1′, 2′ and 1″, 2″ in series with relays 27′ and 27″ bridged by capacitors 26′ and 26″, are connected to the wipers of group selectors 28′ and 28″, respectively, of which the corresponding outlet contacts are relatively multipled and connected by way of resistors (two of which are shown as 29 and 30) to one terminal, for example the negative terminal, of a source of supply. Reference voltages are produced at the base electrodes of the transistors 2′ and 2″ by the use of a common potentiometer 31, 32. If desired, in order to avoid reaction, use may be made of a separate potentiometer for each of the combinations 1′, 2′ and 1″, 2″.

The base electrode of transistor 2′ is connected by way of a comparatively high impedance 50 to the source of reference voltage and the base electrode of transistor 2″ is connected by way of a comparatively high impedance 51 to the source of reference voltage.

If one of the group selectors, for example 28′, hunts for a free outlet in the numerically desired group, the combination 1′, 2′ becomes conductive as soon as the wiper finds a "free" outlet contact (which implies that this contact has a negative voltage higher than the reference voltage) and the relay 27′ is energized, so that under the control of contacts of this relay (not shown) the movement of the group selector 28′ is stopped. However, the outlet contact concerned then assumes a very low negative potential so as to be marked as busy, that is to say the combination 1″, 2″ cannot become conductive for another group selector, for example 28″, when the corresponding outlet contact is reached. However, if the two group selectors 28′ and 28″ make connection with a free outlet contact at exactly the same moment, only one of the two transistor combinations 1′, 2′ and 1″, 2″ becomes conductive similarly as with gaseous discharge tubes.

In the circuits shown in the drawing it may under certain conditions be advantageous to replace the resistor 5 wholly or in part by an inductance. If desired, it is alternatively possible to utilize NPN transistors and PNP transistors of which the emitter and collector electrodes may be interchanged. Furthermore, it may under certain conditions be desirable to lengthen the "release"-time and for this purpose a capacitor 52, for example, may be included between the two base electrodes of the transistors.

What is claimed is:

1. An electrical circuit arrangement exhibiting either a condition in which it has a resistance of very low value or a condition in which it has a resistance of very high value comprising a first transistor of one conductivity type and a second transistor of opposite conductivity type, each of said transistors having an emitter electrode, a collector electrode and a base electrode, the base electrode of each of said transistors being directly connected to the collector electrode of the other of said transistors, an impedance of substantially high value, means including said impedance for applying a reference voltage between the base electrode of said first transistor and the emitter electrode of said second transistor, and means for applying an input voltage between the emitter electrodes of said transistors, said circuit arrangement exhibiting a change in effective resisistance from a high value to a substantially low value when the effective value of said input voltage is larger than the effective value of said reference voltage.

2. An electrical circuit arrangement as claimed in claim 1, further comprising a second impedance of substantially high value connected to the base electrode of said second transistor and means for applying to said second impedance a blocking potential having a low value with respect to the potential of the emitter electrode of said second transistor.

3. An electrical circuit arrangement as claimed in claim 1, wherein said reference voltage applying means comprises a source of direct voltage connected in parallel circuit arrangement with a resistor, said resistor having a tap connected to the base electrode of said first transistor, one end terminal of said resistor being connected to the emitter electrode of said second transistor, and wherein said input voltage applying means comprises a second resistor connected between the other end terminal of said resistor and the emitter electrode of said first transistor and a capacitor connected between the emitter electrodes of said transistors thereby to produce sawtooth voltage variations across said capacitor.

4. An electrical circuit arrangement as claimed in claim 1, wherein said reference voltage applying means comprises a source of control current in series circuit arrangement with an integrating network, a source of direct voltage in parallel circuit arrangement with said series circuit arrangement, means for connecting the junction point of said source of control current and said integrating network to the base electrode of said first transistor, and means for connecting one end terminal of said series circuit arrangement to the emitter electrode of said second transistor.

5. An electrical circuit arrangement as claimed in claim 4, wherein said source of control current comprises a photo-diode.

6. An electrical circuit arrangement as claimed in claim 1, further comprising an electric power consuming device connected in series circuit arrangement with said transistors, said input voltage applying means comprising a source of input voltage in parallel connection with said series circuit arrangement, said source having a high voltage value with respect to the value of the voltage drop across said transistors when said circuit arrangement exhibits said condition of very low value resistance.

7. An electrical circuit arrangement exhibiting either a condition in which it has a resistance of very low value or a condition in which it has a resistance of very high value comprising a first transistor of one conductivity type and a second transistor of opposite conductivity type, each of said transistors having an emitter electrode, a collector electrode and a base electrode, the base electrode of each of said transistors being directly connected to the collector electrode of the other of said transistors, an impedance of substantially high value, means including said impedance for applying a reference voltage between the base electrode of said first transistor and the emitter electrode of said second transistor, means for applying an input voltage between the emitter electrodes of said transistors including a source of input voltage, means for connecting one terminal of said source of input voltage to the emitter electrode of said second transistor, a selector switch connected in series circuit arrangement with said transistors comprising a wiper connected to the emitter electrode of said first transistor and a plurality of outlet contacts connected to respective control circuits exhibiting different potentials and a plurality of resistors connecting said outlet contacts to the other terminal of said input voltage source, said circuit arrangement exhibiting a change in effective resistance from a high value to a substantially low value when the effective value of the input voltage between said emitter electrodes is larger than the effective value of said reference voltage.

8. An electrical circuit arrangement exhibiting either a condition in which it has a resistance of very low value or a condition in which it has a resistance of very high value comprising a first transistor of one conductivity type and a second transistor of opposite conductivity type, each of said transistors having an emitter electrode, a collector electrode and a base electrode, the base electrode of each of said transistors being directly connected to the collector electrode of the other of said transistors, means for applying a reference voltage between the base electrode of said first transistor and the emitter electrode of said second transistor comprising a source of reference voltage, a potentiometer connected across said reference voltage source and an impedance of substantially high value connected between a point on said potentiometer and the base electrode of said first transistor, means for applying an input voltage between the emitter electrodes of said transistors including a source of input voltage, means for connecting one terminal of said input voltage source to the emitter electrode of said second transistor, a selector switch connected in series circuit arrangement with said transistors comprising a wiper connected to the emitter electrode of said first transistor and a plurality of outlet contacts connected to respective control circuits and a plurality of resistors connecting said outlet contacts to the other terminal of said input voltage source, said circuit arrangement exhibiting a change in effective resistance from a high value to a substantially low value when the effective value of the input voltage between said emitter electrodes is larger than the effective value of said reference voltage.

9. An electrical circuit comprising a plurality of stages, each of said stages comprising an electrical circuit arrangement as claimed in claim 8, said stages being connected in parallel across said input voltage source.

References Cited in the file of this patent

UNITED STATES PATENTS

| | | |
|---|---|---|
| 2,569,345 | Shea | Sept. 25, 1951 |
| 2,594,449 | Kircher | Apr. 29, 1952 |
| 2,605,306 | Eberhard | July 29, 1952 |
| 2,655,609 | Shockley | Oct. 13, 1953 |
| 2,663,800 | Herzog | Dec. 22, 1953 |
| 2,663,806 | Darlington | Dec. 22, 1953 |
| 2,666,150 | Blakely | Jan. 12, 1954 |
| 2,698,416 | Sherr | Dec. 28, 1954 |
| 2,751,550 | Chase | June 19, 1956 |